UNITED STATES PATENT OFFICE.

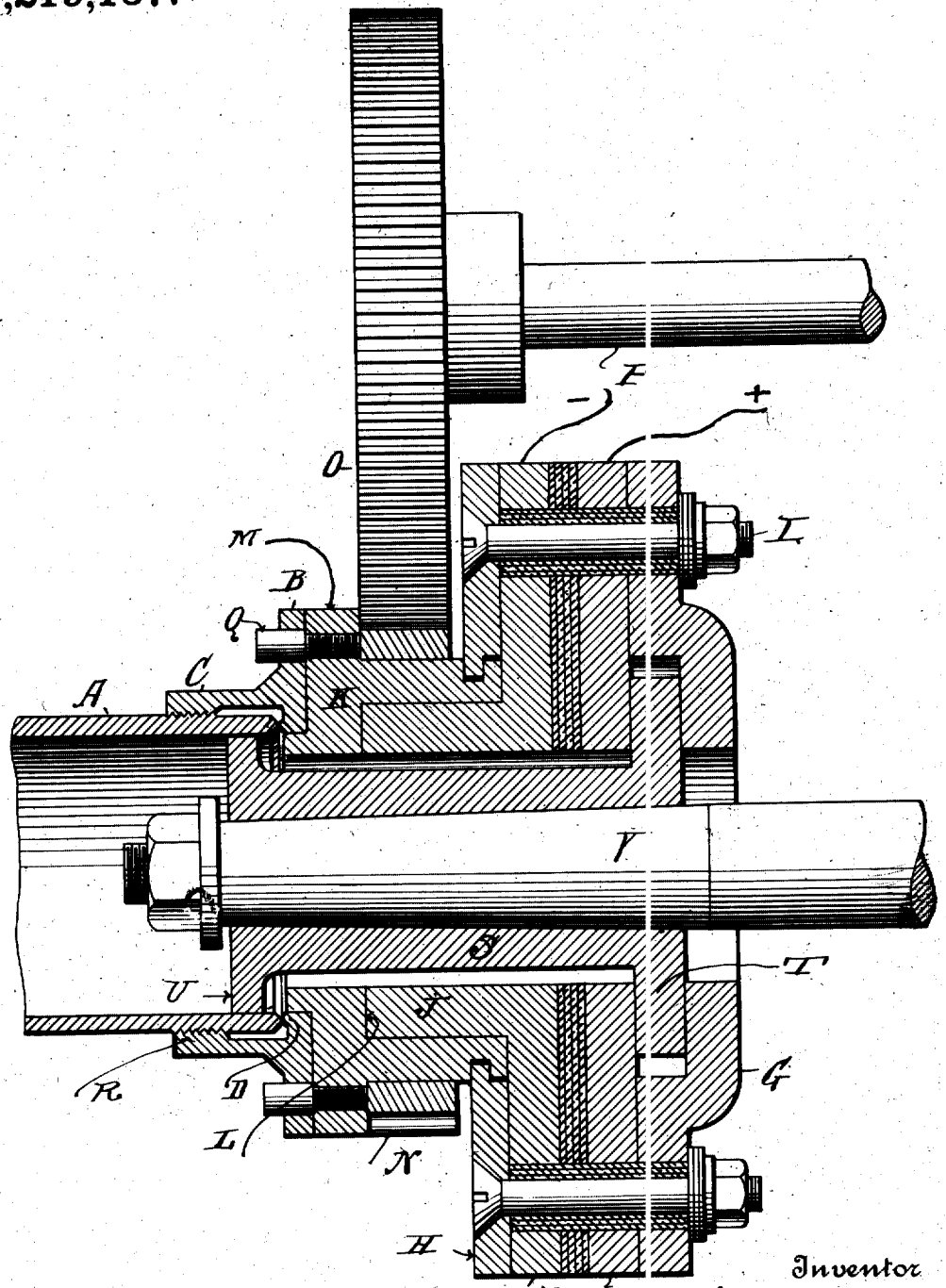

THOMAS E. MURRAY, OF NEW YORK, N. Y.

ELECTRICAL WELDING APPARATUS.

1,219,137.      Specification of Letters Patent.      Patented Mar. 13, 1917.

Application filed November 29, 1916. Serial No. 134,005.

*To all whom it may concern:*

Be it known that I, THOMAS E. MURRAY, a citizen of the United States, residing at New York, in the county of New York and State of New York, have invented a certain new and useful Improvement in Electrical Welding Apparatus, of which the following is a specification.

The invention is an electrical welding apparatus, wherein the rotation of one of the two bodies to be welded, causes a movement of the other of said bodies into pressing contact with said rotating body at the welding joint. The invention is herein shown embodied in an apparatus for butt-welding the end of a tube to a flange plate.

The accompanying drawing is a longitudinal section of a tube and a flange plate to be welded thereon, the said tube and plate being shown in position in the electrodes of a welding machine.

A is the tube, to the end of which the flange plate B is to be electrically welded. On said plate is a preferably integral sleeve C, in which the tube A fits. The sleeve C thus forms a socket for the end of the tube, in which socket is a shoulder, here in the form of a circular rib D on the flange plate B, which rib registers with the butt end of the tube.

The welding electrodes and pressing means are constructed as follows:

E and F are annular plates insulated from one another. On the outer face of plate F is an annular cover plate G. On the outer face of plate E is a flat ring H, having its inner periphery under-cut. The plates E, F, G and ring H are connected by insulated bolts I. On plate E is a circular projection J, which enters a pulley K and abuts against a shoulder L therein. The rim of the pulley is grooved to correspond with the under-cut inner periphery of ring H, so that said ring serves to hold the pulley in place on the circular projection J. Secured on the rim of the pulley K and seated in a shoulder formed by a flange M thereon is a toothed ring N, which engages with a pinion O on shaft P, which shaft is rotated, and so, through pinion O and toothed ring N, rotates pulley K.

The flange plate B is seated in a shoulder on the front face of pulley K, and has openings to receive the pins Q on said face.

The inner periphery of sleeve C is threaded to engage a thread cut on the exterior of tube A, near the end thereof, as shown at R. Hence when the pulley K is rotated in the proper direction, the sleeve C engaging with the tube A forces the butt end of said tube into strong pressing contact with the rib D, and hence at the welding joint between said tube and flange plate B.

In the central openings of pulley K and plates E, F, G is a tubular electrode S, formed in two longitudinally divided half sections. At one end of said electrode is a flange T, received in a circular recess in cover plate G and bearing against plate F. There is a clearance in said recess around flange T, and also a clearance around the body portion of said electrode. At the opposite end of said electrode is a flange U, which enters tube A. A tapered mandrel V is inserted between the sections of electrode S, and when moved inwardly forces said sections outwardly to expand said electrode, and so to cause close contact between flange U and tube A. One terminal of the source of welding current is connected to plate F, and so to electrode S. The other terminal is connected to plate E, so that the pulley K becomes the opposite electrode.

The tube A being adjusted with its butt end in contact with rib D, the welding current is established, and at the same time the pulley K is set in rotation. The joint is thus subjected to great pressure simultaneously with the softening of the metal by the current, and in this way, a very strong joint is produced.

I claim:

1. Electrical welding apparatus, comprising means for rotating one of two bodies to be welded, and means actuated by said rotating body for subjecting to pressure the welding joint between said bodies.

2. Electrical welding apparatus, comprising means for rotating one of two bodies to be welded, and means actuated by said rotating body for moving the other of said bodies into pressing contact with said rotating body at the welding joint.

3. Electrical welding apparatus, comprising means for rotating one of two bodies to be welded, and means actuated by said rotating body and engaging the other body for moving said last-named body into pressing contact with said rotating body at the welding joint.

4. Electrical welding apparatus, comprising means for rotating one of two bodies to be welded, and a sleeve on said body receiving and internally threaded to engage the other of said bodies; whereby upon the rotation of said first-named body, said last-named body shall be drawn into said sleeve and into pressing contact with said rotating body at the welding joint.

5. Electrical tube-welding apparatus, comprising means for rotating the body to which the tube is to be butt-welded, and a sleeve on said body receiving and internally threaded to engage with said tube; whereby said tube is moved longitudinally into pressing butt contact with said rotating body at the welding joint.

In testimony whereof I have affixed my signature in presence of two witnesses.

THOMAS E. MURRAY.

Witnesses:
GERTRUDE T. PORTER,
MAY T. McGARRY.